April 24, 1928.
R. R. DAVIS
1,666,926
REAMING TOOL
Filed March 28, 1924
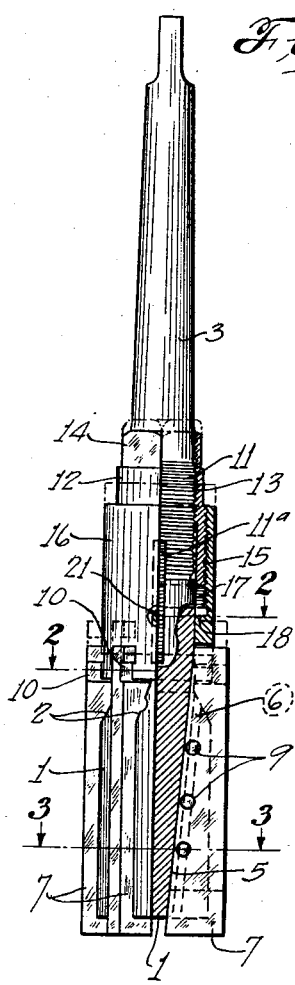
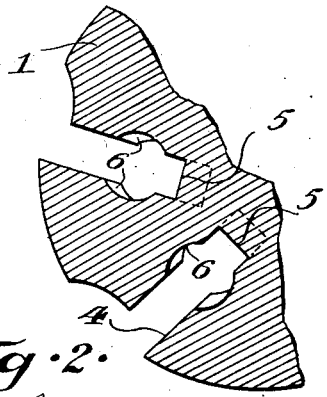
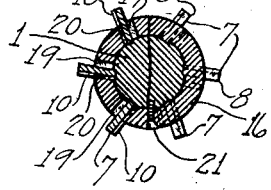
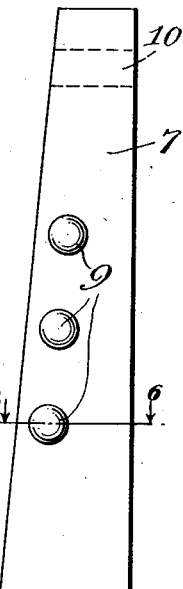
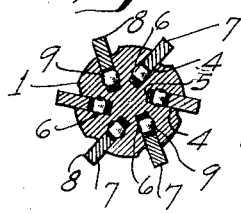
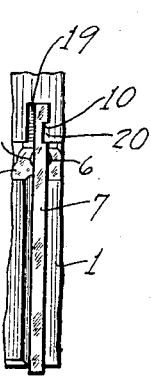
INVENTOR
Robert R. Davis.
BY
ATTORNEY Patented Apr. 24, 1928.

UNITED STATES PATENT OFFICE.

1,666,926

ROBERT R. DAVIS, OF ST. LOUIS, MISSOURI, ASSIGNOR, BY MESNE ASSIGNMENTS, OF ONE-HALF TO GEORGE C. ALBERS AND ONE-HALF TO JOHN D. YOUNG, BOTH OF ST. LOUIS, MISSOURI.

REAMING TOOL.

Application filed March 28, 1924. Serial No. 702,534.

This invention relates generally to metal-working tools and, more particularly, to a certain new and useful improvement in metal-working tools of the type or class commonly known as reamers.

My present invention has for its chief object the provision of an efficient tool of the type or class stated which, briefly, comprises a bar or stock and a series or plurality of cutting-blades or cutters so co-operatively constructed and disposed that upon a lengthwise shifting of the cutters longitudinally or lengthwise of the bar or stock, the cutting-edges of the several cutters shall, with rigidity, accuracy, and precision, be located radially of the bar or stock at the desired or selected working position.

My present invention also has for an object the provision in a tool of the type stated of simple, positive means for individually locking the several cutters rigidly to the bar or stock against radial displacement while, at the same time, permitting lengthwise movement of the cutters relatively to the bar or stock for adjustably locating their cutting edges radially of the bar or stock.

My present invention has for a still further object the provision in a tool of the type stated of cutters and shifting or adjusting means constructed and adapted for interengaging relation for locking the several cutters together for uniform, simultaneous lengthwise movement and against individual lengthwise displacement relatively to the bar or stock.

My present invention has for a further object the provision in a tool of the type stated of compact, readily manipulated means for effecting a simultaneous lengthwise shifting of the several cutters relatively to the bar or stock to effectively dispose their cutting edges radially of the bar or stock for working operations.

My present invention has for an additional object the simplification of the tool shown and described in application filed by me under date of October 29, 1923, and serially numbered 671,472, and the improvement generally upon tools of the class stated.

And with the above and other objects in view, my present invention resides in the novel features of form, construction, arrangement, and combination of parts hereinafter described and pointed out in the claims.

In the accompanying drawing,—

Figure 1 is a view partly in elevation and partly in longitudinal section of a reamer embodying my invention;

Figures 2 and 3 are transverse sectional views of the tool on approximately the lines 2—2 and 3—3, Figure 1;

Figure 4 is a fragmental elevation of the tool; Figure 5 is an enlarged fragmental section of the body of the reamer; Fig. 6 is an enlarged transverse section of one of the cutters taken approximately on the line 6—6, Figure 7; and Figure 7 is an enlarged elevational view of one of the cutters.

Referring now more in detail and by reference characters to the drawing, which illustrates a preferred embodiment of my invention, 1 designates the main body or stock of the tool, which is preferably a cylindrical steel bar or rod of suitable dimensions diametrically reduced intermediate its ends and thereby annularly shouldered, as at 2, and formed or provided longitudinally with a suitably elongated shank 3 for attachment to the machine for rotarily actuating the tool, as will be well understood. For purposes of description, and with reference to the tool as shown in Figure 1, the upper and lower ends of the tool as there shown will be, respectively, designated the rear and forward ends of the tool.

Suitably formed lengthwise in, and opening to the peripheral face of, bar 1, is an annular series of cutter-accommodating slots 4, each of which preferably also opens at one end to the forward end of the tool, at which end the slots 4 are of considerable depth relatively to the diameter of the bar 1. At their opposite or rear end, the slots 5 are relatively shallow in depth and open approximately upon the peripheral face of the shank 3 to the rear of the shoulder 2, the base or lower wall 5 of each slot 4 being smooth, but beveled to incline upwardly and rearwardly from the forward end of bar 1 towards the shank 3, all as best seen in Figure 1; and, for purposes also shortly appearing, the opposite side walls of each slot 4 are lengthwise adjacent the inclined plane bottom or base wall 5, preferably arcuately cut away or recessed, as at 6.

Fitting snugly in the several respective slots 4 for movement both lengthwise and radially of body or bar 1, are suitable cutting blades or cutters 7, each of which is in the form of an approximately oblong rectangular section or block of suitable steel whose outer corner 8 forms the working or cutting edge or lip of the cutter or blade. Each cutter or blade 7, as seen in Figure 1, is, in a manner corresponding to the shape or form of the slots 4, of greater height or depth at its forward end than at its rear end, each blade or cutter 7 for co-operation with the slots 4 being similarly formed or provided with a beveled base or under face that in like degree inclines upwardly from the forward to the rearward end of the blade, and at which beveled face the blade is adapted to rest directly upon, and thereby positively, firmly, and rigidly bear against, the bottom inclined wall 5 of its accommodating slot not only throughout any of its adjustments relatively to bar 1, but also in the actual reaming or other operations in which the tool in use and practice may be employed. Adjacent its beveled underface, each cutter or blade 7 is formed with preferably a series of transverse apertures, in which are loosely disposed or seated relatively small cylindrical steel sections or members 9 rounded at their ends. The sections or members 9 are disposed for the most part in the plane of the blade 7, as seen in Figure 4, but each thereof is of such dimensions or length relatively to the thickness of the blade and to the radius of the slot-wall recesses 5 to project or protrude at their rounded ends laterally beyond the planes of the opposite side faces of the blade and snugly into the slot recesses or seats 5, as also seen in Figure 4. The sections or members 9 thereby engage the opposite side walls of the accommodating slot 4 for its respective blade or cutter 7 and, while freely permitting lengthwise shifting or adjusting movement in the slot 4 of the blade to selectively locate the cutting edge 8 radially of the bar 1, as hereinafter more fully appears, yet positively and rigidly retain the blade from otherwise outward lateral movement or displacement relatively to the bar 1. Thus, in a simple, yet efficient manner, the several blades or cutters 7 are individually locked and retained against radial displacement in the respective slots 4 of the bar 1. Adjacent its rear end and upon one side face, each cutter or blade 7 is provided or formed transversely with a preferably rectangular channel or groove 10, as best seen in Figures 1, 2, and 4, for purposes shortly to appear.

At a suitable distance rearwardly from the shoulder 2, the shank 3 is threaded, as at 11, and formed longitudinally in shank 3 and to some extent, as seen in Figure 1, interrupting the threads 11, is a groove or channel 11ª. Sleeved over and upon the shank 3 and having engagement with the threads 11 for axial adjustment on shank 3, is a cylindrical blade-shifting member or barrel 12 partly internally threaded, as at 13, and preferably hexagonal in surface form at its rearward end, as at 14, for turning engagement by a wrench or other adjusting tool (not shown).

The member 12 is also partly externally threaded as at 15; and bored and counterbored to fit both upon the shank 3 and the member 12, is a so-called collet or blade locking member 16, which, at its counter-bored portion, is internally threaded, as at 17, for engagement with the external threads 15 of member 12, the counter-boring of member 16 providing an annular internal shoulder or stop, as at 18, for purposes shortly appearing. It may be here stated that, relatively to the shank 3, the engaging-threads 11 and 13 between the barrel 12 and shank 3 and the engaging-threads 15 and 17 between the collet 16 and barrel 12 are oppositely disposed, in the present instance the threads 11 and 13 between the barrel 12 and shank 3 being left-hand, while the threads 15 and 17 between the barrel 12 and collet 16 being right-hand.

Formed radially through the collet or member 16 and opening to its forward end, is an annular series of so-called substantially L-shaped end-slots 19, each of which at its open-end or neck portion has a width substantially the same as that of the body-slots 4. In the slots 19 seat the rear ends of the several respective cutters or blades 7, as seen in Figures 1, 2, and 4, and in use and operation and in assembling the tool, the members 12 and 16 are threaded into engaging relation with each other and both sleeved upon and the member 12 engaged with the shank 3, and I may here state that normally, as it may be said, the forward end of collet 16 engages the bar-shoulder 2, and that in such threaded engagement between the barrel 12 and collet 16, or normally, the forward end of the barrel 12 is disposed rearwardly at such distance from the internal shoulder or stop 18 of collet 16 as may in the particular tool be required for effecting the desired radial expansion of the cutters 7 relatively to the bar 1. In such disposition of the members 12 and 16 upon the shank 3, the collet 16 is disposed with the reduced portions or necks of its slots 19 in lengthwise alignment or registration with the body-slots 4. The several cutters 7 with the locking-sections 9 are now endwise shifted rearwardly in the body-slots 4 until their rear-end portions are disposed in the slots 19 of the collet 16, and when so disposed the cutter-channels 10 register with the portions or so-called tongues 20 of the collet which form one wall of the necks of the slots 19. Consequently, with the cutters 7 so disposed, the collet 16 is capable only of such rotary movement relatively to the cutters 7 and the shank 3 as may be permitted by and equal to the depth of the cutter-grooves 10. The collet 16 is hence now given such relatively slight rotary movement, when its slot wall-portions or so-called tongues 20 are so formed to move into and then reside in the cutter-channels or grooves 10. Thus the collet 16 and the several cutters 7 are adapted for interengaging or interlocking relation, and when so interengaged and locked together, it will be evident that the several cutters 7 are rigidly held not only from individual or separate but also from collective lengthwise displacement in the body-slots 4 and all, on an axial shifting of the collet 16 on shank 3, caused to lengthwise move simultaneously and in unison in the several slots 4 and relatively to body or bar 1. The collet 16 and the several cutters 7 being so locked together, a screw 21 is now threaded in the collet 16 to reside at its inner end in the longitudinal shank-slot 11$^a$ and the collet 16 thereby releasably locked against reverse rotary movement on the shank 3. Obviously, however, even when so locked against rotary-movement on the shank 3, the collet 16, and therewith the several cutters 7, are capable of movement axially or longitudinally relatively to the bar 1 and its shank 3. It will be understood that, on removal of the lower end of the screw 21 from the slot 11$^a$, the collet 16 may be reversely rotated on shank 3 to release the several cutters 7 to permit ready replacement or repair of any one or all thereof.

The parts being so assembled and the forward end of the collet 16 engaging the bar-shoulder 2, the several cutters 7 are in their so-called normal position or in the position indicated by full lines in Figure 1, being forwardly projected in their slots 4 and radially contracted relatively to the bar 1. As the barrel 12 is now rotarily moved to the right on the shank 3, the collet 16 will be axially drawn rearwardly relatively to the bar 1, and the several cutters 7 hence caused to lengthwise travel in unison upwardly upon the inclined bottom walls 5 of their accommodating slots 4 and their cutting edges or lips 8 thereby correspondingly located at the desired or selected radially expanded distance from the peripheral face of the bar 1 for effective working operations, as indicated by dotted lines in Figure 1, such rearward movement or travel of the cutters and resulting radial expansion of their cutting edges being limited in the particular tool under the engagement in the rearward axial movement of collet 16 of its internal shoulder or stop 18 with the forward end of the barrel 12. Reversely, as the barrel 12 is rotarily moved to the left on the shank 3, the collet 16 will be axially shifted forwardly on the shank 3 and the several cutters 7 caused to lengthwise in unison travel downwardly upon the inclined bottom walls 5 of their accommodating slots 4 and their cutting edges or lips 8 thereby correspondingly located at the desired or selected radially contracted distance from the peripheral face of the bar 1 for effective working operations, such forward movement or travel of the cutters and the resulting radial contraction of their cutting edges being limited in the particular tool under the engagement in the forward axial movement of collet 3 of its forward end with the bar-shoulder 2. Throughout such axial movement of the collet 16 on the shank 3, it will be evident that the tongue and groove interlocking engagement or relation between the cutters 7 and the collet 16 freely permits of sliding movement of the cutters 7 radially both of the bar 7 and collet 16 in the selective radial location of their cutting edges 8.

I may state here that the pitch of the engaging threads 11 and 13 of the barrel 12 and shank 3 is preferably different from the pitch of the engaging threads 15 and 17 between the barrel 12 and collet 16, the pitch of the threads 11 and 13 being preferably of such ratio relatively to the pitch of the threads 15 and 17 that relatively considerable axial movement of the collet 16 on the shank 3 is effected on each rotation of the barrel 12. I may add that in the present tool such ratio is such that the collet 16 will move through a distance of approximately one-sixth of an inch on each rotation of the barrel 12.

In the present tool, as will be noted, the several cutter accommodating-slots 4 are preferably radially off center, whereby not only are the cutting edges 7 of the cutters more sharply presented to the work in rotations of the tool, but the production and repairing of such cutting edges upon the several cutters greatly facilitated, the cutters at the same time and without any increase of strain thereupon exerting greater cutting power upon the work.

My present tool embodies relatively few parts and all its several parts may be readily manufactured and assembled. The several cutters 7 being mounted and arranged, as described, in connection with the bar 1 and collet 16, while conveniently lengthwise shiftable for effecting radial adjustment of their cutting edges 8 relatively to the bar 1, are firmly and rigidly held in the working operations of the tool, the end thrust of the cutters in such operations being thrown directly upon the rigid end walls of the slots 19 of the collet 16, which construction results in the accomplishment by the use of my tool of working operations of the greatest exactness, accuracy, and precision. And from use and operation, I may add, the present tool has been found exceedingly efficient in reaming, facing, milling, and analogous operations.

I am aware that changes in the form, construction, arrangement, and combination of the several parts of the tool may be made and substituted for those herein shown and described without departing from the nature and principle of my invention.

Having thus described my invention, what I claim and desire to secure by Letters Patent is:

1. A reamer comprising a bar having an annular series of radial slots opening upon its peripheral face and being externally threaded rearwardly of the slots, and cutters disposed in the slots for movement longitudinally of the bar, in combination with an internally threaded collet disposed for axial movement upon the bar and having engagement with the cutters and an internally and externally threaded barrel also disposed upon the bar and having threaded engagement with both the bar and the collet for shifting the collet and the cutters axially of the bar.

2. A reamer comprising a bar having an annular series of radial slots opening upon its peripheral face and being externally threaded rearwardly of the slots, and cutters disposed in the slots for movement longitudinally of the bar, in combination with an internally threaded collet disposed for axial movement upon the bar and having engagement with the cutters, an internally and externally threaded barrel also disposed upon the bar and having threaded engagement with both the bar and the collet for shifting the collet and the cutters axially of the bar, and means for limiting the collet and cutter shifting rotary movement of the barrel upon the bar.

3. A reamer comprising a bar having an annular series of slots opening upon its peripheral face and being externally threaded rearwardly of the slots, the bottom wall of each of said slots being beveled to incline upwardly and rearwardly of the bar, and cutters disposed within said slots for movement longitudinally of the bar, each of said cutters having a correspondingly beveled underface engaging with the beveled face of its slot, whereby a shifting of the cutters longitudinally of the bar is adapted to effect an adjustment of the cutting edges of the cutters radially of the bar, in combination with an internally threaded collet disposed for axial movement upon the bar and having engagement with the cutters, an internally and externally threaded barrel also disposed upon the bar and having threaded engagement with both the bar and the collet for shifting the collet and the cutters axially of the bar, an internal shoulder upon the collet for engagement with the barrel for limiting the rearward collet and cutter shifting rotary movement of the barrel upon the bar, and a shoulder upon the bar for engagement by the collet for limiting the forward collet and cutter shifting rotary movement of the barrel upon the bar.

4. A reamer comprising a bar having a plurality of longitudinal slots opening upon its peripheral face and cutters disposed within the slots, each of the cutters being provided at an end with a transverse groove, in combination with a holding collet disposed for rotary movement upon the bar and having a plurality of substantially L-shaped slots opening to an end thereof, the cutters having their grooved ends disposed in the slots of the collet and the cutters being adapted, on rotary movement of the collet upon the bar, for interengaging locking relation at their grooves with the collet.

5. A reamer comprising a bar having a plurality of longitudinal slots opening upon its peripheral face and cutters disposed within the slots, each of the cutters being provided at an end with a transverse groove, in combination with a holding collet disposed for rotary movement upon the bar and having a plurality of substantially L-shaped slots opening to an end thereof, the cutters having their grooved ends disposed in the slots of the collet and the cutters being adapted, on rotary movement of the collet upon the bar, for interengaging locking relation at their grooves with the collet, and means for locking the collet in rotated position upon the bar.

6. A reamer comprising a bar having a plurality of longitudinal slots opening upon its peripheral face and cutters disposed within the slots, each of the cutters being provided at an end with a transverse groove, in combination with a holding collet disposed for rotary movement upon the bar and having a plurality of substantially L-shaped slots opening to an end thereof, the cutters having their grooved ends disposed in the slots of the collet and the cutters being adapted, on rotary movement of the collet upon the bar, for interengaging locking relation at their grooves with the collet, and a screw having engagement with the collet and with the bar for locking the collet in rotated position upon the bar.

7. A reamer comprising a bar having a radial slot opening upon its peripheral face, in combination with a cutter disposed for adjustable movement in the slot, the cutter having a transverse aperture adjacent its underface, and means including a member disposed in said aperture and having engagement with the bar for retaining the cutter against radial displacement both during adjustments and working operations thereof.

8. A reamer comprising a bar having a radial slot opening upon its peripheral face, a wall of said slot being lengthwise recessed, in combination with a cutter disposed for adjustable movement in the slot, the cutter having a series of transverse apertures adjacent its underface, and means including a series of members disposed in said apertures and thereby carried by and movable with the cutter and having engagement with the bar at said recess for retaining the cutter against radial displacement both during adjustments and working operations thereof.

In testimony whereof, I have signed my name to this specification.

ROBERT R. DAVIS.